(12) United States Patent
Nord et al.

(10) Patent No.: US 10,939,492 B2
(45) Date of Patent: Mar. 2, 2021

(54) PDCP ANCHORED CHANGE OF RELAY BASED CONNECTION

(71) Applicant: Sony Mobile Communications Inc., Tokyo (JP)

(72) Inventors: Lars Nord, Lund (SE); Anders Berggren, Lund (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/335,861

(22) PCT Filed: Oct. 30, 2017

(86) PCT No.: PCT/EP2017/077734
§ 371 (c)(1),
(2) Date: Mar. 22, 2019

(87) PCT Pub. No.: WO2018/083055
PCT Pub. Date: May 11, 2018

(65) Prior Publication Data
US 2019/0254103 A1 Aug. 15, 2019

(30) Foreign Application Priority Data
Nov. 3, 2016 (EP) ..................................... 16197101

(51) Int. Cl.
*H04L 12/801* (2013.01)
*H04L 12/24* (2006.01)
(Continued)

(52) U.S. Cl.
CPC ............. *H04W 76/23* (2018.02); *H04W 4/70* (2018.02); *H04W 8/005* (2013.01);
(Continued)

(58) Field of Classification Search
CPC ..... H04W 76/23; H04W 80/08; H04W 8/005; H04W 4/70; H04W 88/04; H04W 36/03; H04W 36/04
See application file for complete search history.

(56) References Cited

U.S. PATENT DOCUMENTS

2014/0051454 A1* 2/2014 Wirtanen .............. H04W 76/27
455/452.1
2019/0090280 A1* 3/2019 Krishnamoorthy .........................
H04W 74/0833
(Continued)

OTHER PUBLICATIONS

3GPP TSG-RAN WG2 #90, Tdoc R2-15462 (Year: 2015).*
(Continued)

*Primary Examiner* — Faruk Hamza
*Assistant Examiner* — Abusayeed M Haque
(74) *Attorney, Agent, or Firm* — Tucker Ellis LLP

(57) ABSTRACT

A wireless communication device (10) controls changing of a connection of the wireless communication device (10) to an access node (100) of the wire-less communication network between: a relay based connection to the access node (100), and either a direct connection to the access node (100) or another relay based connection to the access node (100). The relay based connection extends via a device-to-device communication link (30) between the wireless communication device (10) and a first further wireless communication device (40). The other relay based connection extends via another device-to-device communication link (30') between the wireless communication device (10) and a second further wireless communication device (40'). Further, the wireless communication (10) sends an indication to the access node (100). The indication enables the access node (100) to identify an existing Packet Data Convergence Protocolcon-
(Continued)

text, which was utilized before changing the connection, and to continue utilizing the existing PDCP context after the changing of the connection.

13 Claims, 6 Drawing Sheets

(51) Int. Cl.
    *H04L 5/14*     (2006.01)
    *H04W 76/23*     (2018.01)
    *H04W 36/00*     (2009.01)
    *H04W 88/04*     (2009.01)
    *H04W 4/70*     (2018.01)
    *H04W 8/00*     (2009.01)
    *H04W 80/08*     (2009.01)
(52) U.S. Cl.
    CPC ....... *H04W 36/0033* (2013.01); *H04W 80/08* (2013.01); *H04W 88/04* (2013.01)

(56) References Cited

U.S. PATENT DOCUMENTS

2019/0159116 A1*   5/2019   Guan .................. H04W 60/00
2020/0092766 A1*   3/2020   Alriksson ......... H04W 36/0058

OTHER PUBLICATIONS

3GPP TSG-RAN WG2 #90, R2-152462 (Year: 2015).*
International Search Report and Written Opinion from corresponding International Application No. PCT/EP2017/077734, dated Feb. 13, 2018; 10 pages.
Ericsson, "Signalling required for UE-NW 1-15 relay selection", 3GPP Draft; R2-152462, Fukuoka, Japan, May 15, 2015, 17 pages.
Alcatel-Lucent: "Discussion on PDCP context transfer", 3GPP Draft; R2-070617-PDCP-Transfer, St. Louis, MO, USA, Feb. 9, 2007, 5 pages.
Srini, "Random technical bits and thoughts: LTE PDCP from eNodeB perspective", Jun. 5, 2010, 8 pages.

* cited by examiner

PDCP ANCHORED CHANGE OF RELAY BASED CONNECTION

FIELD OF THE INVENTION

The present invention relates to methods of controlling communication in a wireless communication network and to corresponding devices.

BACKGROUND OF THE INVENTION

In wireless communication networks, such as a cellular network based on the LTE (Long Term Evolution) radio technology specified by 3GPP ($3^{rd}$ Generation Partnership Project), it is known to a utilize relay based connections between a wireless communication device, also referred to as UE (user equipment), and an access node of the wireless communication network. As compared to a direct connection to the access node, such relay based connection extends via a relay station.

A specific case of a relay based connection uses a further UE as the relay station. The relay based connection may then be established via a device-to-device (D2D) communication link from the UE and a direct radio link from the further UE to the access node. In such scenarios, the UE is also referred to as "remote UE", while the further UE is also referred to as "relay UE". Corresponding functionalities are for example described in 3GPP TS 23.303 V14.0.0 (2016 September), section 4.5.4. These relay functionalities are implemented on an IP (Internet Protocol) level, which means that the relay UE substantially acts as an IP router.

Further, there have been proposals to implement D2D communication based relaying on lower protocol layers, such as discussed in 3GPP document S2-165701 for SA WG2 Meeting #117, 17-21 Oct. 2016, Kaohsiung City, Taiwan. As also mentioned in this document, service continuity is one aspect to be considered when a service is provided over a relay based connection instead of a direct connection. In particular, it is desirable to have a solution which ensures that the remote UE can change between different relay UEs or to a direct connection without any interruption of a service provided on the application layer.

Accordingly, there is a need for techniques that allow for efficiently controlling changes of a relay based connection implemented on lower protocol layers.

SUMMARY OF THE INVENTION

According to an embodiment, a method of controlling communication in a wireless communication network is provided. According to the method, a wireless communication device controls changing of a connection of the wireless communication device to an access node of the wireless communication network between: a relay based connection to the access node, and either a direct connection to the access node or another relay based connection to the access node. Here, the relay based connection extends via a D2D communication link between the wireless communication device and a first further wireless communication device. The other relay based connection extends via another D2D communication link between the wireless communication device and a second further wireless communication device. Further, the wireless communication sends an indication to the access node. The indication enables the access node to identify an existing PDCP (Packet Data Convergence Protocol) context, which was utilized before changing the connection, and to continue utilizing the existing PDCP context after the changing of the connection. The indication may for example comprise a Radio Bearer Identity (Radio Bearer ID).

For a change from the relay based connection to the direct connection, the indication may enable the access node to identify an existing PDCP context of the relay based connection and to utilize the existing PDCP context for the direct connection.

For a change from the direct connection to the relay based connection, the indication may enable the access node to identify an existing PDCP context of the direct connection and to utilize the existing PDCP context for the relay based connection.

For a change from the relay based connection to the other relay based connection, the indication may enable the access node to identify an existing PDCP context of the relay based connection and to utilize the existing PDCP context for the other relay based connection.

Accordingly, various changes in the connection of the wireless communication device to the access node may be anchored in the PDCP layer, which carries both control plane traffic and user plane traffic, and the changes may be performed in a manner which is transparent to higher protocol layers above the PDCP layer, such as an IP layer or RRC (Radio Resource Control) protocol layer.

For a change from the relay based connection to the direct connection the indication may be sent in a message for setting up the direct connection. For example, this message for setting up the direct connection could be defined on the physical layer, e.g., as part of a random access preamble. Alternatively, such message could be a RRC message, e.g., a Connection Request message. In this way, the indication may be provided in an efficient manner, and excessive signalling overhead may be avoided. However, other ways of conveying the indication could be utilized as well, e.g., a dedicated RRC message.

For a change from the relay based connection to the direct connection, the wireless communication device may also send a further indication for prioritizing setup of the direct connection. For example, this indication could be defined as part of a random access preamble. By prioritizing the setup of the direct connection, a risk of an excessive duration of the change of the connection may be reduced, e.g., in situations where the access node is under a high load.

For a change from the direct connection to the relay based connection the indication may be sent in a message for setting up the relay based connection. For example, this message for setting up the relay based connection could be a message for setting up the D2D communication link to the first further wireless communication device. In this way, the indication may be provided in an efficient manner, and excessive signalling overhead may be avoided. However, other ways of conveying the indication could be utilized as well, e.g., a dedicated message defined on the relay based connection.

For a change from the relay based connection to the other relay based connection the indication may be sent in a message for setting up the other relay based connection. For example, this message for setting up the relay based connection could be a message for setting up the D2D communication link to the second further wireless communication device. In this way, the indication may be provided in an efficient manner, and excessive signalling overhead may be avoided. However, other ways of conveying the indication could be utilized as well, e.g., a dedicated message defined on the relay based connection.

According to a further embodiment, a method of controlling communication in a wireless communication network is provided. According to the method, an access node of the wireless communication network controls changing of a connection of the access node to a wireless communication device between a relay based connection to the access node and either a direct connection to the access node or another relay based connection to the access node. Here, the relay based connection extends via a D2D communication link between the wireless communication device and a first further wireless communication device. The other relay based connection extends via another D2D communication link between the wireless communication device and a second further wireless communication device. Further, the access node receives an indication from the wireless communication device. Based on the indication, the access node identifies an existing PDCP context, which was utilized before changing the connection and continues to utilize the existing PDCP context after the changing of the connection. The indication may for example comprise a Radio Bearer ID.

For a change from the relay based connection to the direct connection the access node may identify, based on the indication, an existing PDCP context of the relay based connection and utilize the existing PDCP context for the direct connection.

For a change from the direct connection to the relay based connection, the access node may identify, based on the indication, an existing PDCP context of the direct connection and utilize the existing PDCP context for the relay based connection.

For a change from the relay based connection to the other relay based connection, the access node may identify, based on the indication, an existing PDCP context of the relay based connection and utilize the existing PDCP context for the other relay based connection.

Accordingly, various changes in the connection of the wireless communication device to the access node may be anchored in the PDCP layer, which carries both control plane traffic and user plane traffic, and the changes may be performed in a manner which is transparent to higher protocol layers above the PDCP layer, such as an IP layer or RRC protocol layer.

For a change from the relay based connection to the direct connection the indication may be received in a message for setting up the direct connection. For example, this message for setting up the direct connection could be defined on the physical layer, e.g., as part of a random access preamble. Alternatively, such message could be a RRC message, e.g., a Connection Request message. Accordingly, sending of extra messages for conveying the indication can be avoided by including the indication into a message which would be sent anyway for setting up the direct connection. In this way, the indication may be provided in an efficient manner, and excessive signalling overhead may be avoided. However, other ways of conveying the indication could be utilized as well, e.g., a dedicated RRC message which is defined only for the purpose of conveying the indication.

For a change from the relay based connection to the direct connection, the access node may also receive a further indication for prioritizing setup of the direct connection. For example, this indication could be defined as part of a random access preamble. By prioritizing the setup of the direct connection, a risk of an excessive duration of the change of the connection may be reduced, e.g., in situations where the access node is under a high load.

For a change from the direct connection to the relay based connection the indication may be received in a message for setting up the relay based connection. For example, this message for setting up the relay based connection could be a message for configuring a link between the first further wireless communication device and the access node. In this way, the indication may be provided in an efficient manner, and excessive signalling overhead may be avoided. However, other ways of conveying the indication could be utilized as well, e.g., a dedicated message defined on the relay based connection.

For a change from the relay based connection to the other relay based connection the indication may be received in a message for setting up the other relay based connection. For example, this message for setting up the other relay based connection could be a message for configuring a link between the second further wireless communication device and the access node. In this way, the indication may be provided in an efficient manner, and excessive signalling overhead may be avoided. However, other ways of conveying the indication could be utilized as well, e.g., a dedicated message defined on the relay based connection.

According to a further embodiment, a wireless communication device is provided. The wireless communication device is configured to control changing a connection of the wireless communication device to an access node of the wireless communication network between: a relay based connection to the access node and either a direct connection to the access node or another relay based connection to the access node. Here, the relay based connection extends via a D2D communication link between the wireless communication device and a first further wireless communication device. The other relay based connection extends via another D2D communication link between the wireless communication device and a second further wireless communication device. Further, the wireless communication device is configured to send an indication to the access node. The indication enables the access node to identify an existing PDCP context, which was utilized before changing the connection, and to continue utilizing the existing PDCP context after the changing of the connection. The indication may for example comprise a Radio Bearer ID.

For a change from the relay based connection to the direct connection, the indication may enable the access node to identify an existing PDCP context of the relay based connection and to utilize the existing PDCP context for the direct connection.

For a change from the direct connection to the relay based connection, the indication may enable the access node to identify an existing PDCP context of the direct connection and to utilize the existing PDCP context for the relay based connection.

For a change from the relay based connection to the other relay based connection, the indication may enable the access node to identify an existing PDCP context of the relay based connection and to utilize the existing PDCP context for the other relay based connection.

For a change from the relay based connection to the direct connection, the wireless communication device may be configured to send the indication in a message for setting up the direct connection. For example, this message for setting up the direct connection could be defined on the physical layer, e.g., as part of a random access preamble. Alternatively, such message could be a RRC message, e.g., a Connection Request message.

For a change from the relay based connection to the direct connection, the wireless communication device may also be configured to send a further indication for prioritizing setup of the direct connection. For example, this indication could be defined as part of a random access preamble.

For a change from the direct connection to the relay based connection, the wireless communication device may be configured to send the indication in a message for setting up the relay based connection. For example, this message for setting up the relay based connection could be a message for setting up the D2D communication link to the first further wireless communication device.

For a change from the relay based connection to the other relay based connection, the wireless communication device may be configured to send the indication in a message for setting up the other relay based connection. For example, this message for setting up the other relay based connection could be a message for setting up the D2D communication link to the second further wireless communication device.

According to an embodiment, the wireless communication device may comprise a radio interface for connecting to the access node, either via the relay based connection, the direct connection, or the other relay based connection. Further, the wireless communication device may comprise a processor which is configured to control the above described changing of the connection and to send, via the radio interface, the indication to the access node.

According to a further embodiment, an access node for a wireless communication network is provided. The access node is configured to control changing of a connection of the access node to a wireless communication device between: a relay based connection to the access node and either a direct connection to the access node or another relay based connection to the access node. Here, the relay based connection extends via a D2D communication link between the wireless communication device and a first further wireless communication device. The other relay based connection extends via another D2D communication link between the wireless communication device and a second further wireless communication device. Further, the access node is configured to receive an indication from the wireless communication device and, based on the indication, identify an existing PDCP context, which was utilized before changing the connection, and continue to utilize the existing PDCP context after the changing of the connection. The indication may for example comprise a Radio Bearer ID.

For a change from the relay based connection to the direct connection the access node may be configured to receive the indication in a message for setting up the direct connection. For example, this message for setting up the direct connection could be defined on the physical layer, e.g., as part of a random access preamble. Alternatively, such message could be a RRC message, e.g., a Connection Request message.

For a change from the relay based connection to the direct connection, the access node may also be configured to receive a further indication for prioritizing setup of the direct connection. For example, this indication could be defined as part of a random access preamble.

For a change from the direct connection to the relay based connection, the access node may be configured to receive the indication in a message for setting up the relay based connection. For example, this message for setting up the relay based connection could be a message for configuring a link between the first further wireless communication device and the access node.

For a change from the relay based connection to the other relay based connection, the access node may be configured to receive the indication in a message for setting up the other relay based connection. For example, this message for setting up the other relay based connection could be a message for configuring a link between the second further wireless communication device and the access node.

According to an embodiment, the access node may comprise a radio interface for connecting to the wireless communication device, either via the relay based connection, the direct connection, or the other relay based connection. Further, the access node may comprise a processor which is configured to control the above described changing of the connection and to receive, via the radio interface, the indication to from the wireless communication device.

According to a further embodiment, a system is provided which comprises a wireless communication device as described above and described above. In this system, the relay based connection, the direct connection, and/or the other relay based connection is established between the wireless communication device and the access node and the access node is configured to receive the indication from the wireless communication device.

The above and further embodiments of the invention will now be described in more detail with reference to the accompanying drawings.

DETAILED DESCRIPTION OF EMBODIMENTS

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments described hereinafter.

The illustrated embodiments relate to control of communication in a wireless communication network, in particular to control of communication in scenarios where a wireless communication device can establish a direct connection to an access node of the wireless communication device or a relay based connection to the access node, where the relay based connection is based on a D2D connection from the wireless communication device to a further wireless communication device operating as a relay station, and a direct connection from the further wireless communication device to the access node.

In the examples as illustrated in the following, the wireless communication network is assumed to be based on the LTE radio technology. However, it is to be understood that other technologies could be utilized as well, such as the NR (New Radio) technology developed by 3GPP. In accordance with the LTE terminology, the wireless communication device will in the following be referred to as UE, the further wireless communication device will be referred to as relay UE, and the access node will be referred to as eNB. When using the LTE radio technology, the above-mentioned direct connection between the UE and the eNB may be based on the LTE Uu radio interface. The above-mentioned direct connection between the relay UE and the eNB may be based on the LTE Uu-n radio interface The D2D connection is assumed to be based on an LTE PC5 interface, as for example described in 3GPP TS 23.303 V14.0.0 (2016 September). However, also in this case, alternative radio technologies could be used as well, such as Bluetooth, WLAN (Wireless Local Area Network), or a D2D interface specified within the NR technology.

Figure 1:
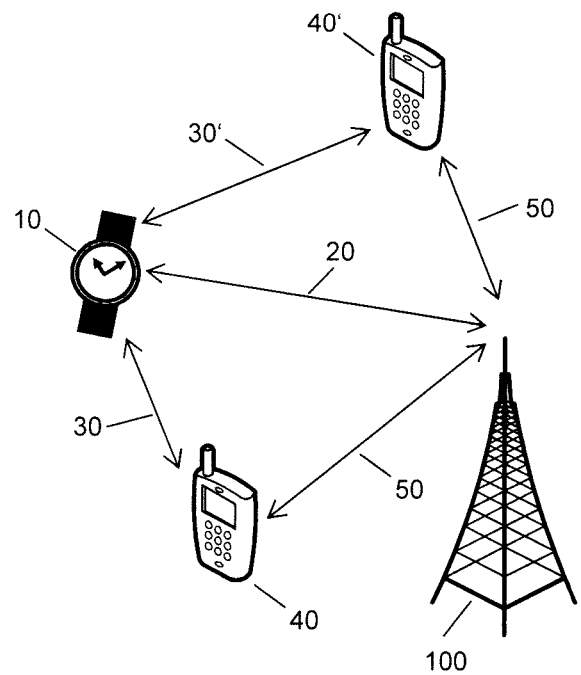
FIG. 1 schematically illustrates a wireless communication network system according to an embodiment of the invention.

FIG. 1 illustrates an example of a scenario which is based on the concepts as outlined above. In the scenario of FIG. 1, a UE 10 can either establish a direct connection 20 or a relay based connection to an eNB 100. As illustrated, the UE 10 may be a wearable device, such as a smartwatch. Further, the UE 10 could be an IoT (Internet of Things) device. The direct connection 20 corresponds to a radio link without any intermediate nodes, while the relay based connection is based on a D2D link 30 between the UE 10 and a relay UE 40, 40' and a direct radio link from the relay UE 40, 40' to the eNB 100. In the example of FIG. 1, two different relay based connections are possible between the UE 10 and the eNB 100: a first relay based connection via the relay UE 40 and a second relay based connection via the relay UE 40'. The concepts as further illustrated below, address scenarios where the UE 10 changes between the different types of connection, e.g., from the first relay based connection to the direct connection 20, and from the direct connection to the first relay based connection, or from the first relay based connection to the second relay based connection.

Figure 2:
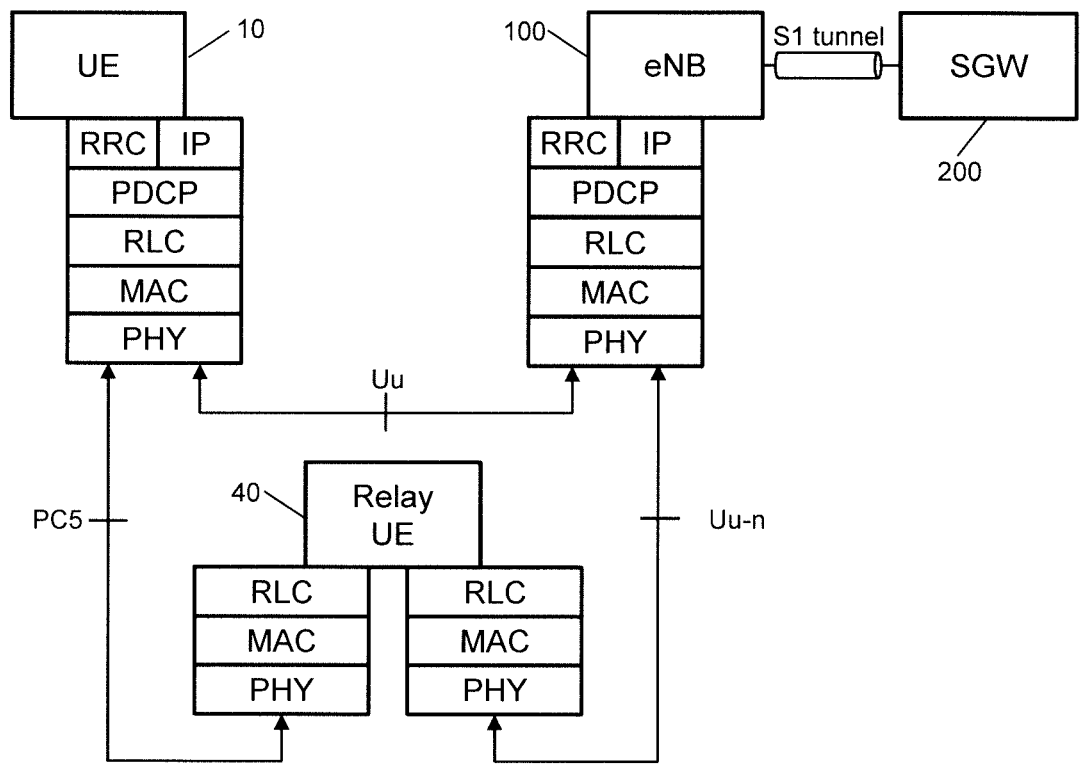
FIG. 2 shows an example of protocol layers as used on connections according to an embodiment of the invention.

FIG. 2 further illustrates the protocol layers in used for the direct connection 20 and for the relay based connection via the relay UE 40. However, it is to be understood that the same protocol architecture would also apply for the relay based connection via the relay UE 40'. As illustrated, the direct connection 20 via the Uu interface between the remote UE 10 and the eNB 100 is based on a protocol stack which includes a PHY (physical) layer, a MAC (Medium Access Control) layer above the PHY layer, an RLC (Radio Link Control) layer above the MAC layer, a PDCP layer above the PDCP layer, and an RRC layer and IP layer above the PDCP layer. It is noted that typically one or more higher layers may be provided above the IP layer. Such higher layers may for example include an application service (AS) layer.

As further illustrated, the relay UE 40 operates on the basis of the protocol layers below the PDCP protocol layer. Accordingly, the relay UE 40 forwards PDCP protocol data units (PDUs) between the UE 10 and the eNB 100.

Further, FIG. 2 illustrates an SGW (Serving Gateway) 200 which is connected via an S1 tunnel to the eNB 100. Transfer of user plane traffic of the UE 10 to or from a core network (CN) part occurs via the SGW 200. For this purpose, the SGW 200 identifies the eNB 100 by an S1 tunnel ID, which is uniquely mapped to a PDCP context and higher layer contexts maintained by the UE 10 and the eNB 100. When changing between the relay based connection and the direct connection, the UE 10 sends an indication to the eNB 100 which allows the eNB 100 to identify the existing PDCP context, and thereby also higher layer contexts. This identifier may for example correspond to a Radio Bearer ID. Having identified the existing contexts, the eNB 100 may continue to utilize these contexts after changing the connection. For example, a security context of the UE 10 can be maintained irrespective of the change of the connection. In this way, an ongoing RRC connection and user plane IP connectivity may be maintained while changing from the relay based connection to the direct connection and vice versa. In a similar way, existing contexts may be identified and continued to be utilized when changing between different relay based connections. More detailed examples of corresponding processes will now be explained with reference to FIGS. 3, 4, and 5.

Figure 3:
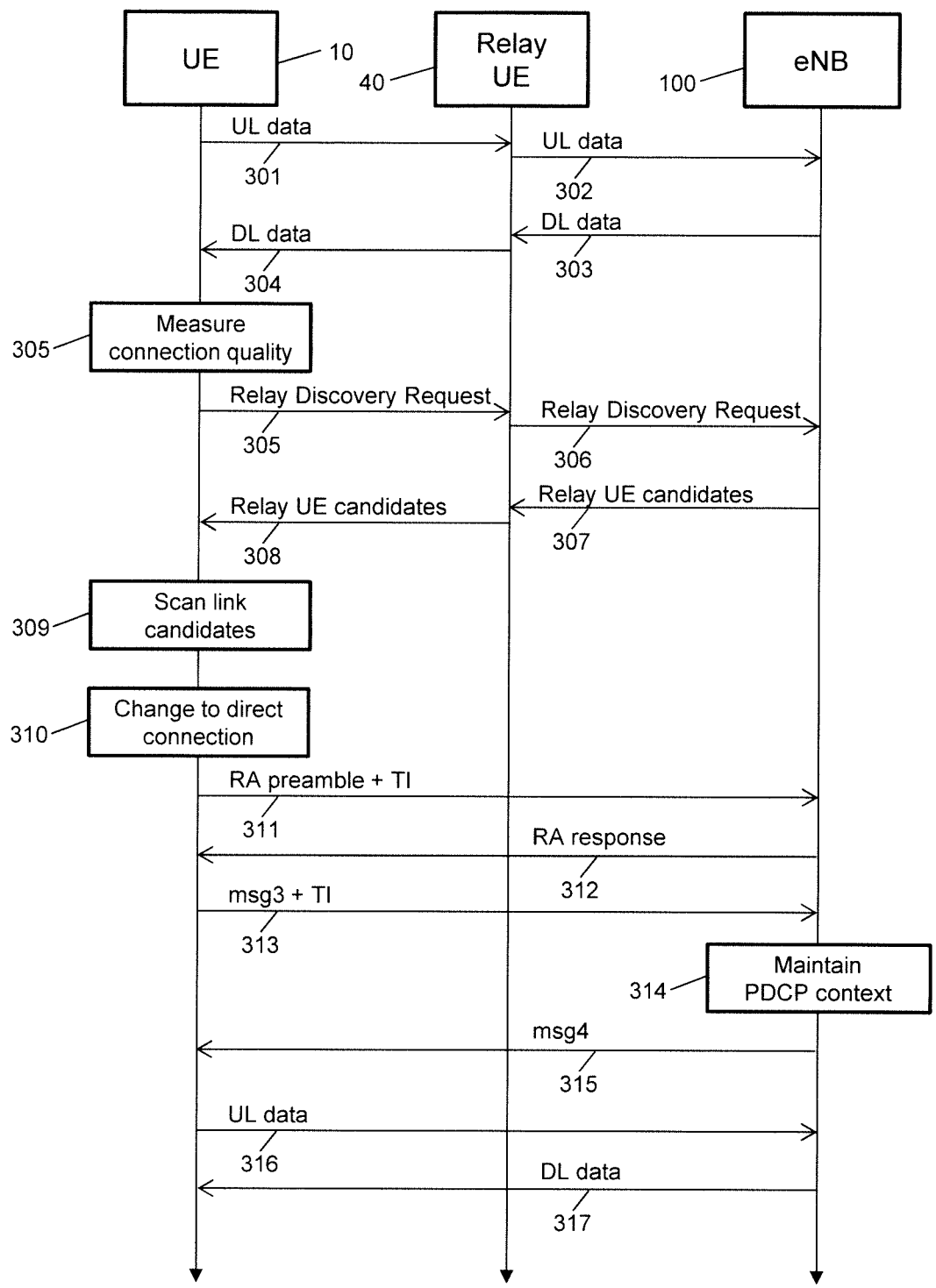
FIG. 3 shows an example of processes according to an embodiment of the invention.

FIG. 3 shows an example of processes which are based on the concepts as outlined above. The processes of FIG. 3 involve the UE 10, the relay UE 40, and the eNB 100.

In the example of FIG. 3, it is assumed that the UE 10 is initially connected by the relay based connection via the relay UE 40 to the eNB 100. Accordingly, the relay UE 40 may forward UL data from the UE 10 to the eNB 100, as illustrated by messages 301 and 302. Similarly, the relay UE 40 may forward DL data from the eNB 100 to the UE 10, as illustrated by messages 303 and 304.

At block 305, the UE 10 measures the quality of the relay based connection to the eNB 100, e.g., in terms of a CQI (Channel Quality Indicator). Based on the measured quality, the UE 10 may decide to send a relay discovery request to the eNB 100. As indicated by messages 305 and 306, the relay UE 40 forwards the relay discovery request to the eNB 100. In response to receiving the relay discovery request, the eNB 100 may send information for discovery of one or more alternative relay UEs to the UE 10. For example, this information may define one or more filter masks for selection of the alternative relay UEs from detected neighboring UEs. Further, this information could also explicitly indicate one or more alternative relay UEs, e.g., in terms of a UE identifier or code. As illustrated by messages 307 and 308, the relay UE 40 may forward the information for discovery of alternative relay UEs to the UE 10. The relay discovery request and the information for discovery of relay UE candidates may for example be based on discovery procedures as described in 3GPP TS 23.303 V14.00.

At block 309, the UE 10 may then scan link candidates to assess whether it should change to another relay based connection via another relay UE or change to a direct connection to the eNB 100. For this purpose, it may compare the quality measured at block 305 to an expected quality of the other possible relay based connections or of the direct connection. As illustrated by block 310, the illustrated example assumes that the UE 10 decides to change to the direct connection.

Accordingly, the UE 10 then proceeds by setting up the direct connection to the eNB 100, which involves performing a Random Access (RA) procedure to gain access to a radio cell of the eNB 100. As illustrated, the RA procedure includes sending a RA preamble 311 to the eNB 100. The RA preamble 311 may include a transfer indication (TI) which indicates to the eNB 100 that the UE already had an existing connection to the eNB 100. In response to detecting the transfer indication, the eNB 100 may prioritize the RA procedure of the UE 10 over other RA procedures to thereby reduce the risk that a delayed access to the cell of the eNB 100 adversely affects service continuity for the UE 10.

The eNB 100 responds to the RA preamble by sending a RA response 312 to the UE 10. The RA response 312 may for example include a first UL (uplink) grant which allocates UL radio resources to the UE 10. Based on the allocated UL radio resources, the UE 10 then sends an RRC Connection Request 313 (also referred to as msg3) to the eNB 100. The RRC Connection Request 313 may include a transfer indication (TI) which indicates to the eNB 100 that the UE already had an existing connection to the eNB 100. The transfer indicator in the RRC Connection Request 313 enables the eNB 100 to identify a PDCP context of the existing connection of the UE 10. For this purpose, the transfer indicator could include a Radio Bearer ID associated with the existing connection. It is noted that in some scenarios, also the transfer indicator in the RA preamble may alternatively or additionally be used to enable the eNB 100 to identify the PDCP context of the existing connection of the UE 10. For example, the transfer indicator in the RA preamble could include at least a part of the Radio Bearer ID associated with the existing connection.

At block 314, the eNB 100 utilizes the received transfer indicator to identify the existing PDCP context of the relay based connection and maintains this PDCP context and typically also associated higher layer contexts for the direct connection which is being established.

The RA procedure then continues by the eNB 100 sending an RRC Connection Setup message 315 (also referred to as msg4) to the UE 10, to which the UE 10 will respond with an RRC Connection Setup Complete message (not illustrated). At this point, the direct connection is established and may be used by the UE 10 for sending UL data to the eNB 100, as illustrated by message 316. Similarly, the direct connection may then be used by the eNB 100 for sending DL data to the UE 10, as illustrated by message 317.

Figure 4:
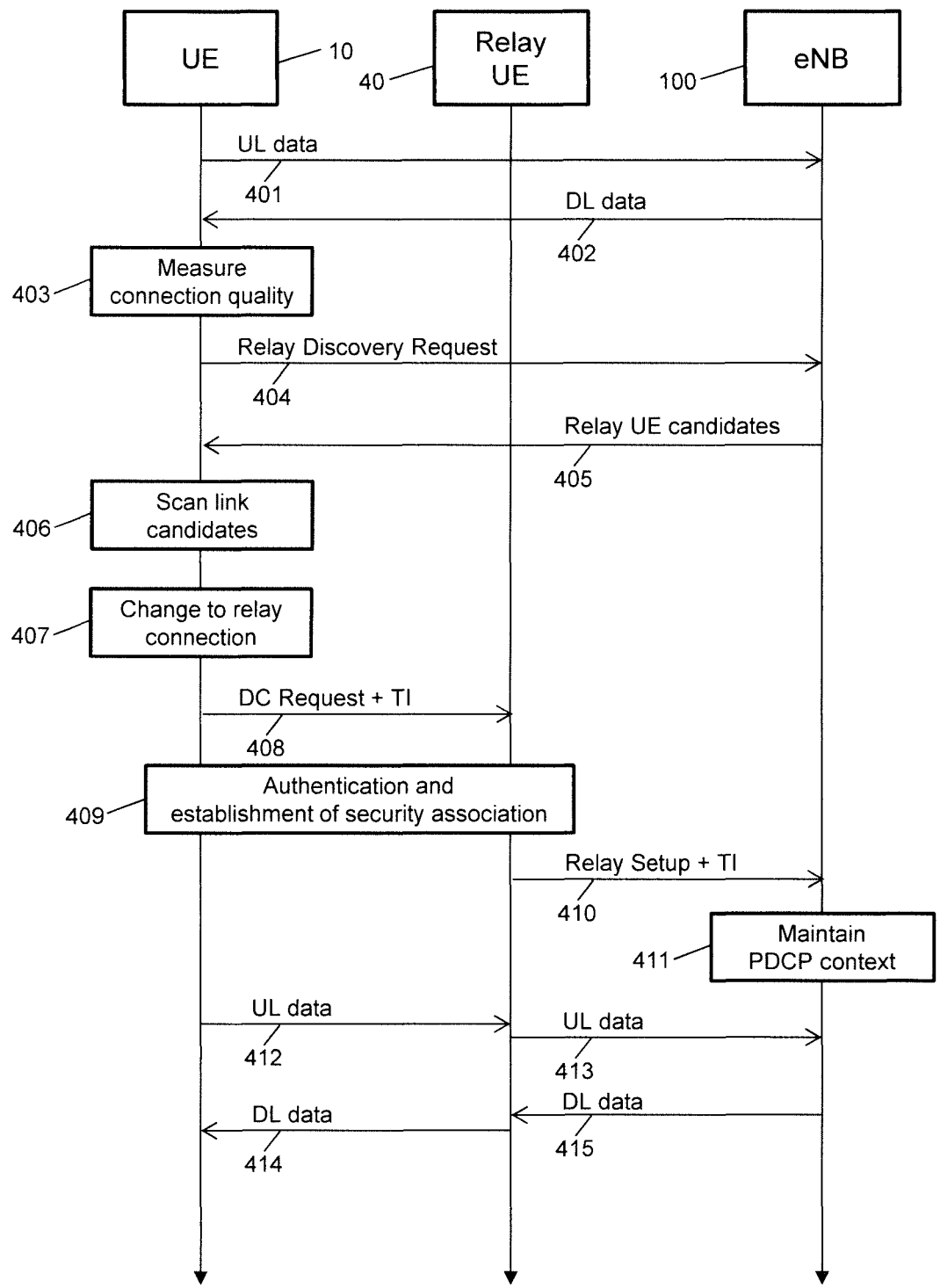
FIG. 4 shows a further example of processes according to an embodiment of the invention.

FIG. 4 shows a further example of processes which are based on the concepts as outlined above. The processes of FIG. 4 involve the UE 10, the relay UE 40, and the eNB 100.

In the example of FIG. 4, it is assumed that the UE 10 is initially connected by the direct connection to the eNB 100. Accordingly, the UE 10 may send UL data to the eNB 100, as illustrated by message 401. Similarly, the direct connection may be used by the eNB 100 for sending DL data to the UE 10, as illustrated by message 402.

At block 403, the UE 10 measures the quality of the direct connection to the eNB 100, e.g., in terms of a CQI. Based on the measured quality, the UE 10 may decide to send a relay discovery request 404 to the eNB 100. In response to receiving the relay discovery request 404, the eNB 100 may send information for discovery of one or more relay UEs to the UE 10. For example, this information may define one or more filter masks for selection of the alternative relay UEs from detected neighboring UEs. Further, this information could also explicitly indicate one or more alternative relay UEs, e.g., in terms of a UE identifier or code. The relay discovery request 404 and the information for discovery of relay UE candidates 405 may for example be based on discovery procedures as described in 3GPP TS 23.303 V14.00.

At block 406, the UE 10 may then scan link candidates to assess whether it should change to a relay based connection. For this purpose, it may compare the quality measured at block 403 to an expected quality of possible relay based connections. As illustrated by block 407, the illustrated example assumes that the UE 10 decides to change to the relay based connection via the relay UE 40.

The UE 10 then proceeds by setting up the relay based connection to the eNB 100, which involves initiating establishment of the D2D link to the relay UE 40 by sending a Direct Connection (DC) Request 408 to the relay UE 40. As further illustrated by block 409, this may also interact with the relay UE 40 to perform authentication of the UE 10 and establishment of a security association of the UE 10. When the D2D link is established, the relay UE 40 sends a relay setup message 410 to the eNB 100, so as to configure the direct connection between the relay UE 40 and the eNB 100 for relay operation with respect to the UE 10. As illustrated, the DC Request 408 and the relay setup message 410 may include a transfer indication (TI) which indicates to the eNB 100 that the UE already had an existing connection to the eNB 100. The transfer indicator enables the eNB 100 to identify a PDCP context of the existing connection of the UE 10. For this purpose, the transfer indicator could include a Radio Bearer ID associated with the existing connection. The DC Request 408 and the procedures of block 409 may for example be based procedures for establishment of a secure layer-2 link over PC5 as described in 3GPP TS 23.303 V14.00. It is noted that in some scenarios, the TI indication could also be conveyed in some other message, e.g., in a message for authentication of the UE 10 and establishment of a security association in block 409.

At block 411, the eNB 100 utilizes the received transfer indicator to identify the existing PDCP context of the relay based connection and maintains this PDCP context and typically also associated higher layer contexts for the direct connection which is being established. When establishment of the relay based connection is completed, the relay based connection may be used by the UE 10 for sending UL data to the eNB 100. Similarly, the relay based connection may then be used by the eNB 100 for sending DL data to the UE 10. As illustrated by messages 412, 413, 414, and 415, this involves that the relay UE 40 forwards the UL data from the UE 10 to the eNB 100 and/or forwards the DL data from the eNB 100 to the UE 10.

Figure 5:
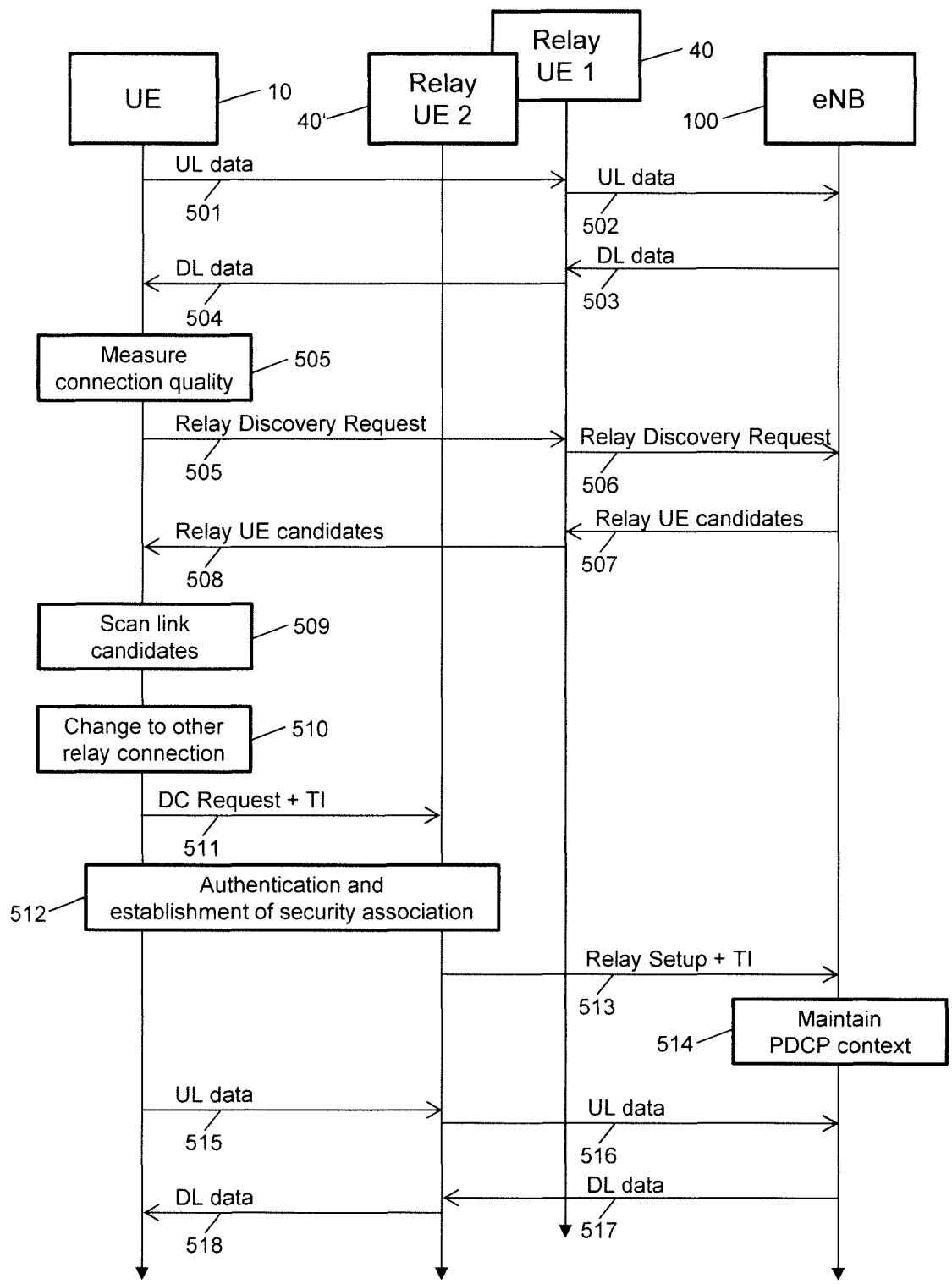
FIG. 5 shows a further example of processes according to an embodiment of the invention.

FIG. 5 shows a further example of processes which are based on the concepts as outlined above. The processes of FIG. 5 involve the UE 10, the relay UE 40 (in the following referred to as first relay UE), the relay UE 40' (in the following referred to as second relay UE), and the eNB 100.

In the example of FIG. 5, it is assumed that the UE 10 is initially connected by the first relay based connection via the first relay UE 40 to the eNB 100. Accordingly, the first relay UE 40 may forward UL data from the UE 10 to the eNB 100, as illustrated by messages 501 and 502. Similarly, the first relay UE 40 may forward DL data from the eNB 100 to the UE 10, as illustrated by messages 503 and 504.

At block 505, the UE 10 measures the quality of the first relay based connection to the eNB 100, e.g., in terms of a CQI. Based on the measured quality, the UE 10 may decide to send a relay discovery request to the eNB 100. As indicated by messages 505 and 506, the relay UE 40 forwards the relay discovery request to the eNB 100. In response to receiving the relay discovery request, the eNB 100 may send information for discovery of one or more alternative relay UEs to the UE 10. For example, this information may define one or more filter masks for selection of the alternative relay UEs from detected neighboring UEs. Further, this information could also explicitly indicate one or more alternative relay UEs, e.g., in terms of a UE identifier or code. As illustrated by messages 507 and 508, the relay UE 40 may forward the information for discovery of alternative relay UEs to the UE 10. The relay discovery request and the information for discovery of relay UE candidates may for example be based on discovery procedures as described in 3GPP TS 23.303 V14.00.

At block 509, the UE 10 may then scan link candidates to assess whether it should change to another relay based connection via another relay UE or change to a direct connection to the eNB 100. For this purpose, it may compare the quality measured at block 505 to an expected quality of the other possible relay based connections or of the direct connection. As illustrated by block 510, the illustrated example assumes that the UE 10 decides to change to another relay based connection, in particular to the second relay based connection via the second relay UE 40'.

The UE 10 then proceeds by setting up the second relay based connection to the eNB 100, which involves initiating establishment of the D2D link to the second relay UE 40' by sending a Direct Connection (DC) Request 511 to the second relay UE 40'. As further illustrated by block 512, this may also interact with the second relay UE 40' to perform authentication of the UE 10 and establishment of a security association of the UE 10. When the D2D link is established, the second relay UE 40' sends a relay setup message 513 to the eNB 100, so as to configure the direct connection between the second relay UE 40' and the eNB 100 for relay operation with respect to the UE 10. As illustrated, the DC Request 511 and the relay setup message 513 may include a transfer indication (TI) which indicates to the eNB 100 that the UE already had an existing connection to the eNB 100. The transfer indicator enables the eNB 100 to identify a PDCP context of the existing connection of the UE 10. For this purpose, the transfer indicator could include a Radio Bearer ID associated with the existing connection. The DC Request 511 and the procedures of block 512 may for example be based procedures for establishment of a secure layer-2 link over PC5 as described in 3GPP TS 23.303 V14.00. It is noted that in some scenarios, the TI indication could also be conveyed in some other message, e.g., in a message for authentication of the UE 10 and establishment of a security association in block 512.

At block 514, the eNB 100 utilizes the received transfer indicator to identify the existing PDCP context of the first relay based connection and maintains this PDCP context and typically also associated higher layer contexts for the second relay based connection which is being established. When establishment of the second relay based connection is completed, the second relay based connection may be used by the UE 10 for sending UL data to the eNB 100. Similarly, the second relay based connection may then be used by the eNB 100 for sending DL data to the UE 10. As illustrated by messages 515, 516, 517, and 518, this involves that the relay UE 40 forwards the UL data from the UE 10 to the eNB 100 and/or forwards the DL data from the eNB 100 to the UE 10.

The examples of FIGS. 3, 4, and 5 assume that the change of the connection is triggered on the basis of connection quality measurements by the UE 10. However, it is noted that various other criteria could be used in addition or as an alternative for triggering the change of the connection. For example, the quality of the existing connection could be assessed by the eNB 100, and based on the assessed quality, the eNB 100 could initiate the change of the connection, e.g., by requesting the UE 10 to monitor candidate relay UEs. Further, the change of the connection could also be triggered by detecting transmission errors on the existing connection. For example, in the examples of FIGS. 3 and 5 the eNB 100 could detect that acknowledgments for transmission of the DL data are not received via the relay UE 40 and then initiate the change of the connection. This could be achieved by paging the UE 10, using a paging message which requests the UE 10 to setup the connection or another relay based connection, while maintaining the existing PDCP context. Further, in the examples of FIGS. 3 and 5 the UE 10 could detect that acknowledgments for transmission of the UL data are not received via the relay UE 40 and then initiate the change of the connection.

In addition, it is noted that the examples of FIGS. 3, 4, and 5 do not illustrate processes for releasing the existing connection, such as releasing the direct connection between the UE 10 and the eNB 100 or releasing of the D2D link between the UE 10 and the relay UE 40. Such processes may be triggered once establishment of the new connection starts. In some scenarios, the existing connection may also be maintained until establishment of the new connection is completed. This may allow for further reducing the risk of service interruption on higher layers.

Figure 6:
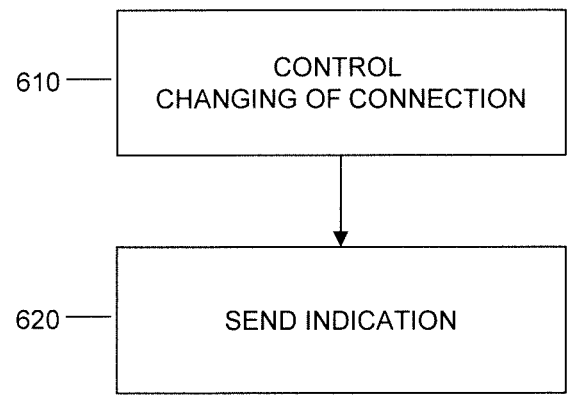
FIG. 6 shows a flowchart for illustrating a method according to an embodiment of the invention.

FIG. 6 shows a flowchart illustrating a method of controlling communication in a wireless communication network, by which a wireless communication device, e.g., the above-mentioned UE 10, may implement concepts as described above. If a processor based implementation of the wireless communication device is utilized, at least a part of the steps of the method may be performed and/or controlled by one or more processors of the wireless communication device.

At step 610, the wireless communication device controls changing of a connection of the wireless communication device to an access node of the wireless communication network, e.g., a connection to the above-mentioned eNB 100. The connection may be changed between a relay based connection to the access node and a direct connection to the access node. Further, the connection may be changed between a relay based connection to the access node and another relay based connection to the access node. The relay based connection extends via a D2D communication link between the wireless communication device and a first further wireless communication device. The other relay based connection extends via another D2D communication link between the wireless communication device and a second further wireless communication device. Examples of such relay based connections are illustrated in FIG. 1. The D2D communication link may be based on the PC5 interface of the LTE radio technology. However, it is to be understood that other technologies could be used as well for the D2D communication link, e.g., a Bluetooth or WLAN technology.

The change of the connection may be triggered on the basis of various criteria. Such criteria may be based on measured quality of the connection before the change and/or expected quality of the connection after the change. The measured quality and/or expected quality may be assessed by the wireless communication device and/or by the access node. In some scenarios, the change of the connection may be triggered at the wireless communication device. In other scenarios, the change of the connection may be triggered at the access node.

At step 620, the wireless communication device sends an indication to the access node. The indication enables the access node to identify an existing PDCP context, which was utilized before changing the connection, and to continue utilizing the existing PDCP context after the changing of the connection. The indication may for example comprise a Radio Bearer ID.

For a change from the relay based connection to the direct connection, the indication may enable the access node to identify an existing PDCP context of the relay based connection and to utilize the existing PDCP context for the direct connection. An example of corresponding processes is described in connection with FIG. 3.

For a change from the direct connection to the relay based connection, the indication may enable the access node to identify an existing PDCP context of the direct connection and to utilize the existing PDCP context for the relay based connection. An example of corresponding processes is described in connection with FIG. 4.

For a change from the relay based connection to the other relay based connection, the indication may enable the access node to identify an existing PDCP context of the relay based connection and to utilize the existing PDCP context for the other relay based connection. An example of corresponding processes is described in connection with FIG. 5.

For a change from the relay based connection to the direct connection the indication may be sent in a message for setting up the direct connection. For example, this message for setting up the direct connection could be defined on the physical layer, e.g., as part of a random access preamble. An example of such physical layer message is the random access preamble 311 in the processes of FIG. 3. Alternatively, such message could be a RRC message, e.g., a Connection Request message. An example of such RRC message is the RRC Connection Request message 313 in the processes of FIG. 3.

For a change from the relay based connection to the direct connection, the wireless communication device may also send a further indication for prioritizing setup of the direct connection. For example, this indication could be defined as part of a random access preamble, e.g., as described in connection with the random access preamble 311 in the processes of FIG. 3.

For a change from the direct connection to the relay based connection the indication may be sent in a message for setting up the relay based connection. For example, this message for setting up the relay based connection could be a message for setting up the D2D communication link to the first further wireless communication device, such as the DC Request 408 in the processes of FIG. 4. Accordingly, the indication may be sent in a message of the PC5 Signalling Protocol as specified in 3GPP TS 23.303 V14.0.0.

For a change from the relay based connection to the other relay based connection the indication may be sent in a message for setting up the other relay based connection. For example, this message for setting up the other relay based connection could be a message for setting up the D2D communication link to the second further wireless communication device, such as the DC Request 511 in the processes of FIG. 5. Accordingly, the indication may be sent in a message of the PC5 Signalling Protocol as specified in 3GPP TS 23.303 V14.0.0.

Figure 7:
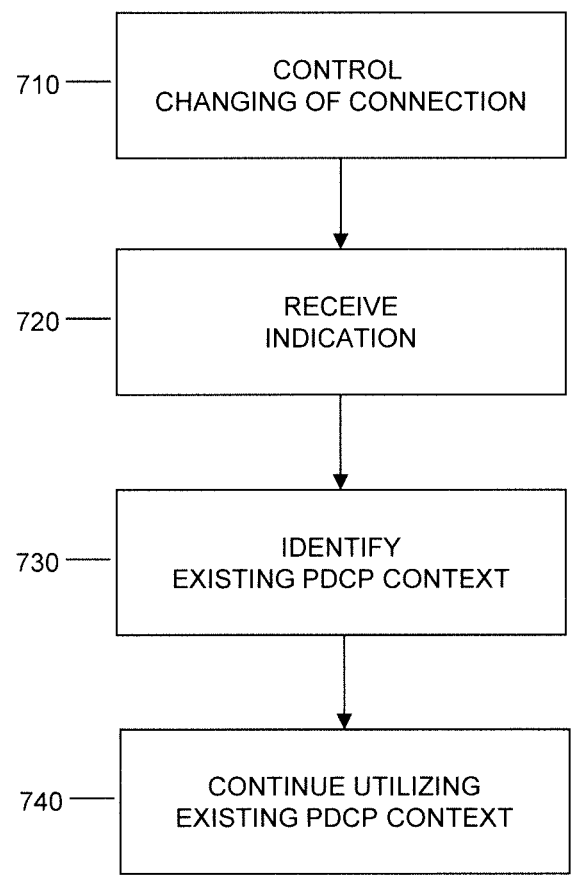
FIG. 7 shows a flowchart for illustrating a further method according to an embodiment of the invention.

FIG. 7 shows a flowchart illustrating a method of controlling communication in a wireless communication network, by which an access node of the wireless communication network, e.g., the above-mentioned eNB 100, may implement concepts as described above. If a processor based implementation of the access node is utilized, at least a part of the steps of the method may be performed and/or controlled by one or more processors of the node.

At step 710, controls changing of a connection of the access node to a wireless communication device, e.g., the above-mentioned UE 10. The connection may be changed between a relay based connection to the access node and a direct connection to the access node. Further, the connection may be changed between a relay based connection to the access node and another relay based connection to the access node. The relay based connection extends via a D2D communication link between the wireless communication device and a first further wireless communication device. The other relay based connection extends via another D2D communication link between the wireless communication device and a second further wireless communication device. Examples of such relay based connections are illustrated in FIG. 1. The D2D communication link may be based on the PC5 interface of the LTE radio technology. However, it is to be understood that other technologies could be used as well for the D2D communication link, e.g., a Bluetooth or WLAN technology.

The change of the connection may be triggered on the basis of various criteria. Such criteria may be based on measured quality of the connection before the change and/or expected quality of the connection after the change. The measured quality and/or expected quality may be assessed by the wireless communication device and/or by the access node. In some scenarios, the change of the connection may be triggered at the wireless communication device. In other scenarios, the change of the connection may be triggered at the access node.

At step 720, the access node receives an indication from the wireless communication device. The indication enables the access node to identify an existing PDCP context, which was utilized before changing the connection, and to continue utilizing the existing PDCP context after the changing of the connection. The indication may for example comprise a Radio Bearer ID.

For a change from the relay based connection to the direct connection the indication may be received in a message for setting up the direct connection. For example, this message for setting up the direct connection could be defined on the physical layer, e.g., as part of a random access preamble. An example of such physical layer message is the random access preamble 311 in the processes of FIG. 3. Alternatively, such message could be a RRC message, e.g., a Connection Request message. An example of such RRC message is the RRC Connection Request message 313 in the processes of FIG. 3.

For a change from the relay based connection to the direct connection, the access node may also receive a further indication for prioritizing setup of the direct connection. For example, this indication could be defined as part of a random access preamble, e.g., as described in connection with the random access preamble 311 in the processes of FIG. 3. Upon receiving the indication for prioritizing setup of the direct connection, the access node may prioritize the establishment of the direct connection to the wireless communication device over establishment of a direct connection to one or more other wireless communication devices.

For a change from the direct connection to the relay based connection the indication may be received in a message for setting up the relay based connection. For example, this message for setting up the relay based connection could be a message for setting up the D2D communication link to the first further wireless communication device, such as the DC Request 408 in the processes of FIG. 4. Accordingly, the indication may be sent in a message of the PC5 Signalling Protocol as specified in 3GPP TS 23.303 V14.0.0.

For a change from the relay based connection to the other relay based connection the indication may be sent in a message for setting up the other relay based connection. For example, this message for setting up the other relay based connection could be a message for setting up the D2D communication link to the second further wireless communication device, such as the DC Request 511 in the processes of FIG. 5. Accordingly, the indication may be sent in a message of the PC5 Signalling Protocol as specified in 3GPP TS 23.303 V14.0.0.

At step 730, the access node identifies the existing PDCP context based on the indication received at step 720. For example, if the indication comprises a Radio Bearer ID, the access node may identify the existing context as the PDCP context which is associated with this Radio Bearer ID. In addition, the access node may also identify higher level contexts which are associated with the existing PDCP context.

At step 740, the access node continues to utilize the existing PDCP context after the changing of the connection. This may involve maintaining an existing RRC connection and/or maintaining existing user plane connections on the IP level or AS level. In this way, service continuity may be implemented on low protocol levels and in a manner which is transparent to protocol layers above the PDCP layer.

It is noted that the methods of FIGS. 6 and 7 may also be combined in a system which includes a wireless communication device operating according to the method of FIG. 6 and an access node operating according to the method of FIG. 7. In such system the relay based connection, the direct connection, and/or the other relay based connection would be established between the wireless communication device and the access node, and the access node would configured to receive the indication from the wireless communication device.

Figure 8:
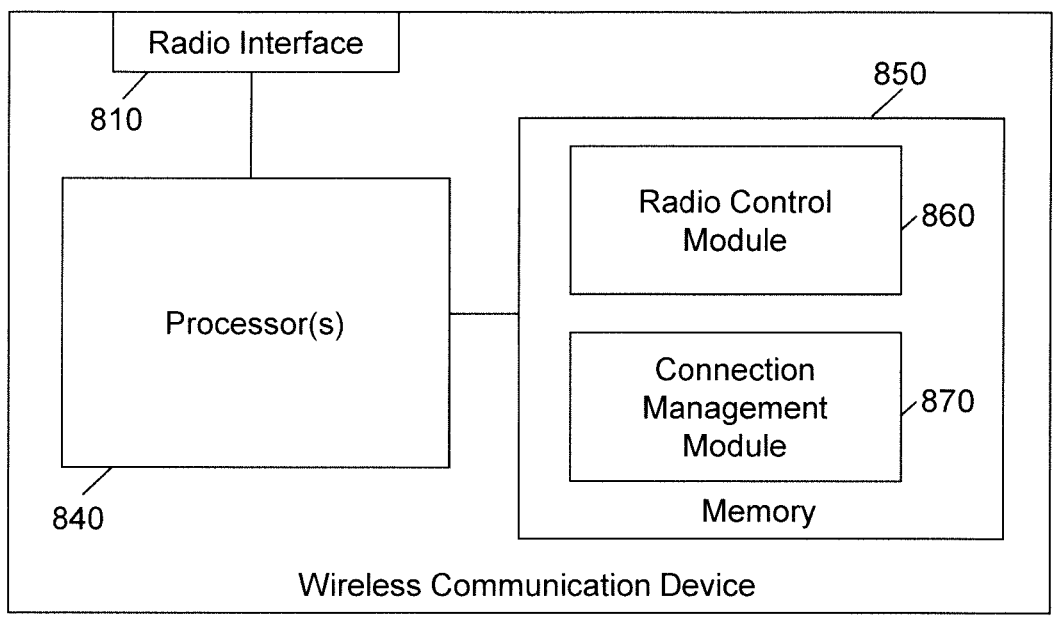
FIG. 8 schematically illustrates a processor-based implementation of a wireless communication device according to an embodiment of the invention.

FIG. 8 shows a block diagram for schematically illustrating a processor based implementation of a wireless communication device which may be utilized for implementing the above concepts. The wireless communication device may for example correspond to a UE, such as above-mentioned UE 10.

As illustrated, the wireless communication device includes a radio interface 810. The wireless communication device may utilize the radio interface 810 for connecting to a wireless communication network, e.g., through an access node of the wireless communication network, such as the eNB 100. Further, the wireless communication device may utilize the radio interface 810 for establishing a direct connection to the access node or a relay based connection via a D2D communication link to the access node. In other words, the radio interface 810 may support both direct connectivity to the wireless communication network and D2D communication based relay operation. The direct connectivity and the D2D communication may be based on the same radio technology, e.g., both on the LTE technology or both on the NR technology. Alternatively, the direct connectivity and the D2D communication may be based on different radio technologies. For example, the direct connectivity could be based on the LTE technology or NR technology while the D2D communication is based on a WLAN technology or Bluetooth technology.

Further, the wireless communication device is provided with one or more processors 840 and a memory 850. The radio interface 810, and the memory 850 are coupled to the processor(s) 840, e.g., using one or more internal bus systems of the wireless communication device.

The memory 850 includes program code modules 860, 870 with program code to be executed by the processor(s) 840. In the illustrated example, these program code modules include a radio control module 860 and a connection management module 870.

The radio control module 860 may implement and control the functionalities for establishing, maintaining, releasing, and utilizing a connection to the wireless communication network. The connection management module 870 may implement and control the above-described functionalities of changing between direct and relay based connections while maintaining the same PDCP context and the above-described functionalities related to sending of the indication, e.g., as described in connection with FIG. 6.

It is to be understood that the structures as illustrated in FIG. 8 are merely exemplary and that the wireless communication device may also include other elements which have not been illustrated, e.g., structures or program code modules for implementing known functionalities of a UE or other type of wireless communication device.

Figure 9:
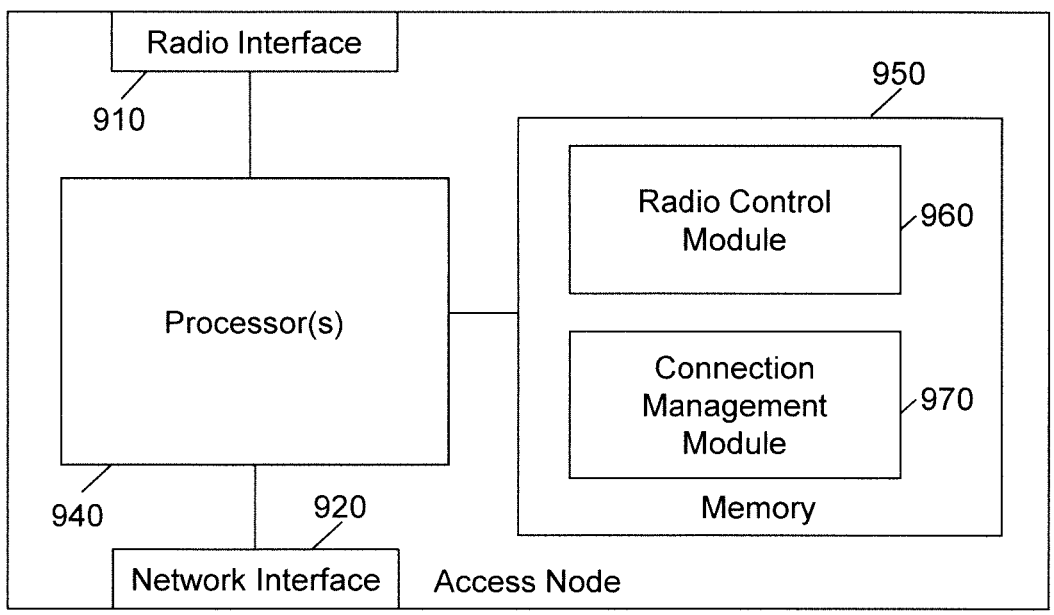
FIG. 9 schematically illustrates a processor-based implementation of a network node according to an embodiment of the invention.

FIG. 9 shows a block diagram for schematically illustrating a processor based implementation of an access node of a wireless communication network which may be utilized for implementing the above concepts, such as above-mentioned the above-mentioned eNB 100.

As illustrated, the access node includes a radio interface 910. The access node may utilize the radio interface 910 for connecting to one or more wireless communication devices, such as the above-mentioned UE 10, or the above-mentioned relay UEs 40, 40'. Further, the access node may utilize the radio interface 910 for establishing a direct connection to the wireless communication device or a relay based connection via a D2D communication link to the wireless communication device. As further illustrated, the access node may be provided with a network interface 920, which may be used for connecting to other nodes of the wireless communication network, e.g., to other access node or two CN nodes.

Further, the access node is provided with one or more processors 940 and a memory 950. The radio interface 910, and the memory 950 are coupled to the processor(s) 940, e.g., using one or more internal bus systems of the base station.

The memory 950 includes program code modules 960, 970 with program code to be executed by the processor(s) 940. In the illustrated example, these program code modules include a radio control module 960, and a connection management module 970.

The radio control module 960 may implement and control functionalities of establishing, maintaining, releasing, and utilizing a connection to the wireless communication device. The connection management module 970 may implement the above-described functionalities of changing between direct and relay based connections while maintaining the same PDCP context and the above-described functionalities related to receiving of the indication, e.g., as described in connection with FIG. 7.

It is to be understood that the structures as illustrated in FIG. 9 are merely exemplary and that the base station may also include other elements which have not been illustrated, e.g., structures or program code modules for implementing known functionalities of an eNB or other type of access node.

It is to be understood that the concepts as explained above are susceptible to various modifications. For example, the concepts could be applied in connection with various kinds of radio technologies and radio devices, without limitation the LTE radio technology or NR technology. Further, it is noted that the concepts may be applied with respect to various types of technologies for D2D communication, without limitation to the above-mentioned examples of LTE D2D communication, Bluetooth, or WLAN.

The invention claimed is:

1. A method of controlling communication in a wireless communication network, the method comprising:

a wireless communication device controlling changing of
  a connection of the wireless communication device to
  an access node of the wireless communication network
  between:
a relay based connection to the access node, the relay
  based connection extending via a device-to-device
  communication link between the wireless communication device and a first further wireless communication
  device, and
either a direct connection to the access node or another
  relay based connection to the access node, the other
  relay based connection extending via another device-to-device communication link between the wireless
  communication device and a second further wireless
  communication device; and
the wireless communication device sending an indication
  to the access node, the indication enabling the access
  node to identify an existing Packet Data Convergence
  Protocol context, which was utilized before changing
  the connection, and to continue utilizing the existing
  Packet Data Convergence Protocol context after the
  changing of the connection.

2. The method according to claim 1,
wherein for a change from the relay based connection to
  the direct connection, the indication enables the access
  node to identify an existing Packet Data Convergence
  Protocol context of the relay based connection and to
  utilize the existing Packet Data Convergence Protocol
  context for the direct connection.

3. The method according to claim 1,
wherein for a change from the direct connection to the
  relay based connection, the indication enables the
  access node to identify an existing Packet Data Convergence Protocol context of the direct connection and
  to utilize the existing Packet Data Convergence Protocol context for the relay based connection.

4. The method according to claim 1,
wherein for a change from the relay based connection to
  the other relay based connection, the indication enables
  the access node to identify an existing Packet Data
  Convergence Protocol context of the relay based connection and to utilize the existing Packet Data Convergence Protocol context for the other relay based connection.

5. The method according to claim 1,
wherein for a change from the relay based connection to
  the direct connection the indication is sent in a message
  for setting up the direct connection, and/or
wherein for a change from the direct connection to the
  relay based connection the indication is sent in a
  message for setting up the relay based connection,
  and/or
wherein for a change from the relay based connection to
  the other relay based connection the indication is sent
  in a message for setting up the other relay based
  connection.

6. A method of controlling communication in a wireless
communication network, the method comprising:
an access node of the wireless communication network
  controlling changing of a connection of the access node
  to a wireless communication device between:
a relay based connection to the access node, the relay
  based connection extending via a device-to-device
  communication link between the wireless communication device and a first further wireless communication
  device, and
either a direct connection to the access node or another
  relay based connection to the access node, the other
  relay based connection extending via another device-to-device communication link between the wireless
  communication device and a second further wireless
  communication device;
the access node receiving an indication from the wireless
  communication device;
based on the indication, the access node identifying an
  existing Packet Data Convergence Protocol context,
  which was utilized before changing the connection; and
the access node continuing to utilize the existing Packet
  Data Convergence Protocol context after the changing
  of the connection.

7. The method according to claim 6,
wherein for a change from the relay based connection to
  the direct connection the access node identifies, based
  on the indication, an existing Packet Data Convergence
  Protocol context of the relay based connection and
  utilizes the existing Packet Data Convergence Protocol
  context for the direct connection.

8. The method according to claim 6,
wherein for a change from the direct connection to the
  relay based connection, the access node identifies,
  based on the indication, an existing Packet Data Convergence Protocol context of the direct connection and
  utilizes the existing Packet Data Convergence Protocol
  context for the relay based connection.

9. The method according to claim 6,
wherein for a change from the relay based connection to
  the other relay based connection, the access node
  identifies, based on the indication, an existing Packet
  Data Convergence Protocol context of the relay based
  connection and to utilize the existing Packet Data
  Convergence Protocol context for the other relay based
  connection.

10. The method according to claim 6,
wherein for a change from the relay based connection to
  the direct connection the indication is received in a
  message for setting up the direct connection, and/or
wherein for a change from the direct connection to the
  relay based connection the indication is received in a
  message for setting up the relay based connection,
  and/or
wherein for a change from the relay based connection to
  the other relay based connection the indication is
  received in a message for setting up the other relay
  based connection.

11. A wireless communication device, comprising:
a radio interface for communication with a wireless
  communication network; and
a processor for controlling the wireless communication
  device, wherein the processor is configured to:
control changing of a connection of the wireless communication device to an access node of the wireless
  communication network between:
a relay based connection to the access node, the relay
  based connection extending via a device-to-device
  communication link between the wireless communication device and a first further wireless communication
  device, and
either a direct connection to the access node or another
  relay based connection to the access node, the other
  relay based connection extending via another device-to-device communication link between the wireless
  communication device and a second further wireless
  communication device; and send an indication to the access node, the indication enabling the access node to identify an existing Packet Data Convergence Protocol context, which was utilized before changing the connection, and to continue utilizing the existing Packet Data Convergence Protocol context after the changing of the connection.

12. An access node for a wireless communication network, comprising:
- a radio interface for communication with one or more wireless communication devices; and
- a processor for controlling the access node, wherein the processor is configured to:
- control changing of a connection of the access node to a wireless communication device between:
  - a relay based connection to the access node, the relay based connection extending via a device-to-device communication link between the wireless communication device and a first further wireless communication device, and
  - either a direct connection to the access node or another relay based connection to the access node, the other relay based connection extending via another device-to-device communication link between the wireless communication device and a second further wireless communication device;
- receive an indication from the wireless communication device;
- based on the indication, identify an existing Packet Data Convergence Protocol context, which was utilized before changing the connection; and
- continue to utilize the existing Packet Data Convergence Protocol context after the changing of the connection.

13. A system, comprising:
- a wireless communication device, and
- an access node according to claim 12,
- wherein the relay based connection, the direct connection, and/or the other relay based connection are established between the wireless communication device and the access node, and
- wherein the access node is configured to receive the indication from the wireless communication device.

* * * * *